Aug. 10, 1926.  S. E. HORTON  1,595,964
CHUCK
Filed May 1, 1922  3 Sheets-Sheet 1

Inventor:
Sidney E. Horton,
by Emery Booth Janney & Varney
Attys

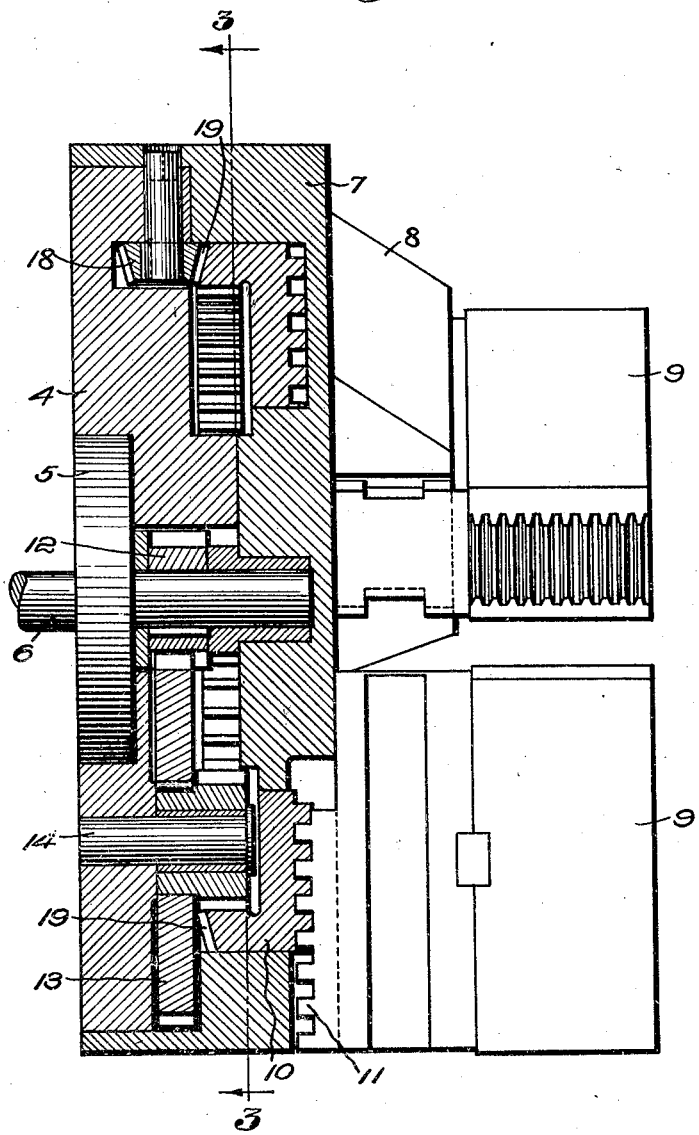

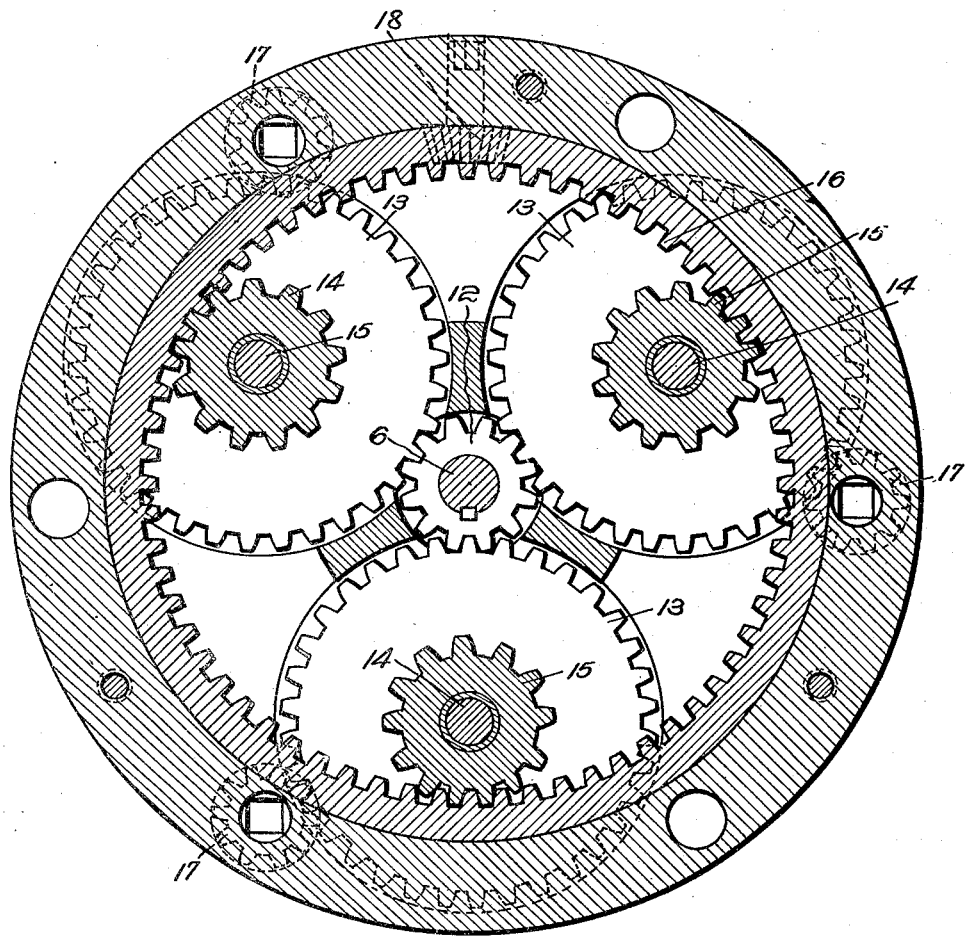

Patented Aug. 10, 1926.

1,595,964

UNITED STATES PATENT OFFICE.

SIDNEY E. HORTON, OF WINDSOR LOCKS, CONNECTICUT, ASSIGNOR TO THE E. HORTON & SON COMPANY, OF WINDSOR LOCKS, CONNECTICUT, A CORPORATION OF CONNECTICUT.

CHUCK.

Application filed May 1, 1922. Serial No. 557,547.

This invention pertains to improvements in chucks, and particularly, though not exclusively, to chucks adapted for use in connection with multiple spindle lathes such as the Bullard "Mult-au-Matic" lathe. It is also useful in connection with ordinary lathes, and may be operated either while the chuck is rotating or at rest.

In the drawings, which show a preferred form of one embodiment of my invention:—

Fig. 2 is a section on the line 2—2 of Fig. 1, being partly in elevation; and

Fig. 3 is a section on the line 3—3 of Fig. 2, being partly in elevation.

Figure 1:
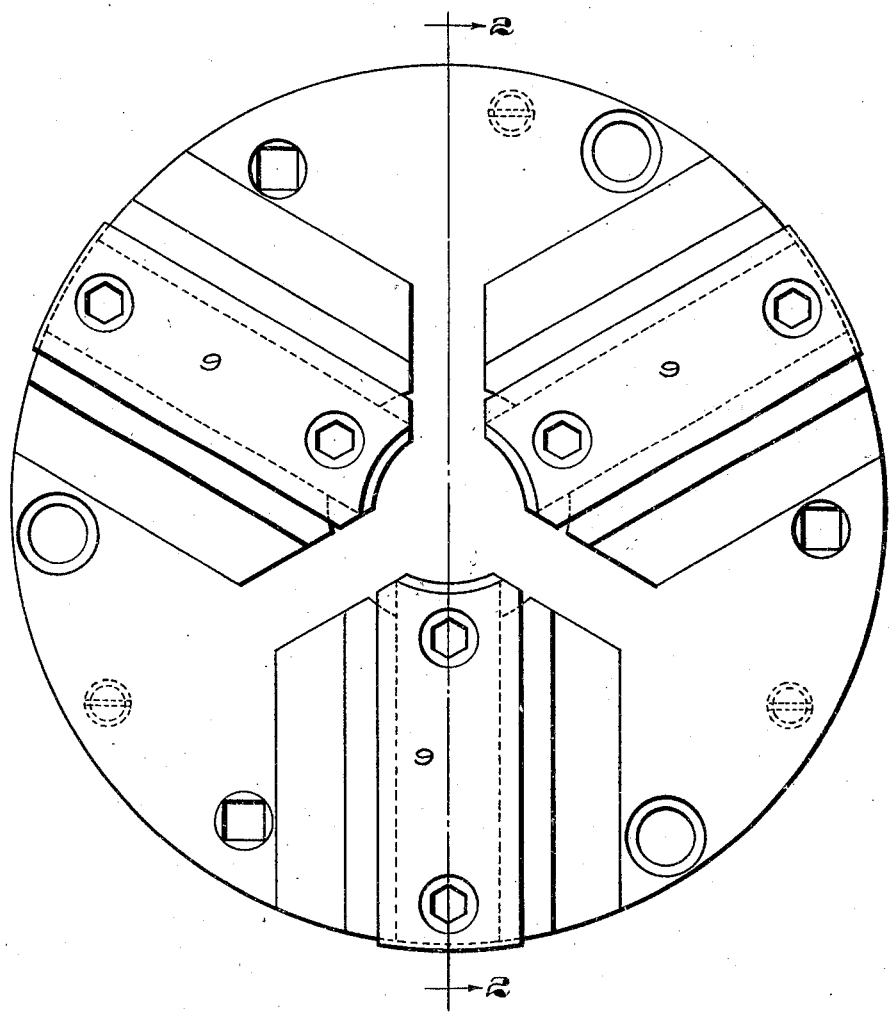
Figure 1 is a front elevation of a chuck.

Referring to the drawings and to the preferred form of my invention selected for illustrative purposes, I have shown a chuck body including a back plate 4 adapted to be mounted on the hollow spindle of a lathe or "Mult-au-Matic" which may enter the recess 5, the shaft 6 passing through the hole in the hollow spindle. The chuck body also includes the body part 7 presenting ways 8 in which the chuck jaws 9 are slidably mounted. Contained within the body is a scroll 10 engaging teeth 11 on the chuck jaws and adapted simultaneously to move the jaws toward or from the axis of the chuck as the scroll 10 is rotated relative to the chuck body.

To rotate the scroll 10, I have provided gearing actuated by rotation of the shaft 6, such gearing including a pinion 12 mounted on the shaft 6 and meshing with the pinions 13, 13, 13 rotatable on shafts 14, 14, 14 secured to the back plate 4 of the body, as best shown in Fig. 2. Carried by and rotating with the pinions 13, I have shown relatively small pinions 15, 15, 15, preferably keyed to the pinions 13 and meshing with a gear on the scroll 10, such gear herein typified by the internal gear 16. If the chuck body be held stationary and the shaft 6 be rotated, the pinion 12 will rotate, effecting rotation of the pinions 13 and 14, the latter effecting rotation of the internal gear 16 and therefore of the scroll 10 relative to the chuck body to actuate the jaws. Where, as is preferably the case, the pinions 13 are considerably larger than the pinion 12 which drives them, and the pinions 14 driven with the pinions 13 are smaller than the pinions 13, the gear on the scroll 10 being relatively large, a very considerable multiplication of torque is provided so that a relatively small torque on the shaft 6 will produce relatively great torque on the scroll 10 and consequently supply great jaw-engaging and disengaging pressure. The arrangement of gearing described lends itself to the very compact and strong chuck, especially where the pinions 13 are partially or wholly enclosed in the recesses in the back plate 4.

For use in "Mult-au-Matic" lathes, I prefer that the chuck body be held stationary by any suitable mechanism, preferably acting on the spindle while power is applied to rotate the shaft 6 to actuate the jaws. To admit of operation of the chuck independently of rotation of the shaft 6, I have provided pinions 17, 17, 17 mounted in the chuck body and meshing with the pinions 13, the pinions 17 being adapted to be turned by a suitable tool inserted from the face of the chuck.

To admit actuation of the jaws from the periphery of the chuck, I have provided a bevel pinion 18 meshing with the teeth of the gear 19 on the scroll 10. The shaft of the pinion 18 extends adjacent the periphery of the chuck, and may be engaged by a suitable key. The provision for manual operation of the chuck by the pinions 17, affording a great multiplication, is peculiarly useful in connection with "Mult-au-Matic" lathes, wherein it is desired to secure great gripping force and keep the tool in operation even should the power actuating the chuck jaws through the shaft 6 and pinion 12 be for any reason out of order.

While I have shown and described a preferred embodiment of my invention, it will be understood that the scope of my invention is best defined in the following claims.

Claims.

1. A chuck comprising, in combination, a body, a shaft concentric with said body and adapted to pass through the spindle of the lathe, a pinion carried by said shaft, a gear meshing with said pinion, jaws, oscillatory means for actuating said jaws toward and from the work, connections between said gear and said oscillatory means for oscillating the latter by rotation of said pinion in opposite directions and an auxiliary manually operable pinion meshing with said gear for actuating said jaws independently of said first named pinion.

2. A chuck comprising, in combination, a body, a shaft concentric with said body and adapted to pass through the spindle of the lathe, a pinion carried by said shaft, a gear meshing with said pinion, jaws, oscillatory means for actuating said jaws toward and from the work, connections between said gear and said oscillatory means for oscillating the latter by rotation of said pinion in opposite directions and an auxiliary manually operable pinion meshing with said gear for actuating said jaws independently of said first named pinion, said auxiliary manually operable pinion adjacent the periphery of said chuck body and operable from the face of said chuck.

3. A chuck comprising, in combination, a body, a shaft concentric with said body and adapted to pass through the spindle of the lathe, a pinion carried by said shaft, a plurality of gears meshing with said pinion, jaws, oscillatory means for actuating said jaws toward and from the work, connections between said gears and said oscillatory means for oscillating the latter by rotation of said pinion in opposite directions and auxiliary manually operable pinions meshing with said gears for actuating said jaws independently of said first named pinion.

4. A chuck comprising, in combination, a body, a shaft concentric with said body and adapted to pass through the spindle of the lathe, a pinion carried by said shaft, a plurality of gears meshing with said pinion, jaws, oscillatory means for actuating said jaws toward and from the work, connections between said gears and said oscillatory means for oscillating the latter by rotation of said pinion in opposite directions and auxiliary manually operable pinions meshing with said gears for actuating said jaws independently of said first named pinion, said auxiliary manually operable pinion adjacent the periphery of said chuck body and operable from the face of said chuck.

In testimony whereof, I have signed my name to this specification.

SIDNEY E. HORTON.